(12) United States Patent
Cho et al.

(10) Patent No.: US 11,518,302 B2
(45) Date of Patent: Dec. 6, 2022

(54) AUXILIARY HANDLE DEVICE CONFIGURED TO BE USED IN ENTERING OR EXITING VEHICLE

(71) Applicants: HYUNDAI MOTOR COMPANY, Seoul (KR); KIA CORPORATION, Seoul (KR); NVH KOREA, INC., Ulsan (KR)

(72) Inventors: Min Ho Cho, Suwon-si (KR); Ji Ah Kim, Seoul (KR); Jin Ho Hwang, Cheonan-si (KR); Ha Ryung Park, Osan-si (KR); Jae Hoon Jung, Hwaseong-si (KR)

( * ) Notice: Subject to any disclaimer, the term of this patent is extended or adjusted under 35 U.S.C. 154(b) by 0 days.

(21) Appl. No.: 17/510,783

(22) Filed: Oct. 26, 2021

(65) Prior Publication Data

US 2022/0348135 A1 Nov. 3, 2022

(30) Foreign Application Priority Data

May 3, 2021 (KR) .......... 10-2021-0056984

(51) Int. Cl.
    *B60Q 3/267* (2017.01)
    *B60Q 3/51* (2017.01)
    *F21V 8/00* (2006.01)

(52) U.S. Cl.
    CPC .............. *B60Q 3/267* (2017.02); *B60Q 3/51* (2017.02); *G02B 6/009* (2013.01); *G02B 6/0073* (2013.01)

(58) Field of Classification Search
CPC ........ B60Q 3/267; B60Q 3/51; G02B 6/0073; G02B 6/009
See application file for complete search history.

(56) References Cited

U.S. PATENT DOCUMENTS

| | | | | |
|---|---|---|---|---|
| 2003/0081401 | A1* | 5/2003 | Camarota | A47K 3/003 362/337 |
| 2004/0109324 | A1* | 6/2004 | Tiesler | B60Q 3/82 362/488 |
| 2013/0135884 | A1* | 5/2013 | Stakoe | B60Q 3/267 29/525.01 |
| 2013/0301289 | A1* | 11/2013 | Durkin | B60Q 3/16 362/544 |
| 2015/0138800 | A1* | 5/2015 | Salter | B60Q 3/217 362/510 |

* cited by examiner

*Primary Examiner* — Mary Ellen Bowman
(74) *Attorney, Agent, or Firm* — McDonnell Boehnen Hulbert & Berghoff LLP

(57) ABSTRACT

The present disclosure provides an auxiliary handle device configured to be used in entering or exiting a vehicle. The auxiliary handle device includes a cover unit including first and second movement guides, which define a movement path, a guide frame unit, which is connected to the cover unit so as to be slidably moved along a rail of a mounting plate mounted on a roof of the vehicle, and a handle unit, which is mounted on the cover unit so as to be selectively projected downwards from the mounting plate, the handle unit including a first guide pin and a second guide pin, which are respectively mounted in the first movement guide and the second movement guide such that the first and second guide pins are moved while being rotated so as to project the handle unit downwards from the mounting plate.

14 Claims, 8 Drawing Sheets

AUXILIARY HANDLE DEVICE CONFIGURED TO BE USED IN ENTERING OR EXITING VEHICLE

CROSS REFERENCE TO RELATED APPLICATIONS

This application claims, under 35 U.S.C. § 119(a), the benefit of and priority to Korean Patent Application No. 10-2021-0056984 filed on May 3, 2021, the entire contents of which are incorporated herein by reference.

BACKGROUND

(a) Technical Field

The present disclosure relates to an auxiliary handle device configured to be used in entering or exiting a vehicle. More particularly, it relates to an auxiliary handle device configured to be used in entering or exiting a vehicle, which, when a door is opened, is configured to be selectively lowered toward the opened door from a lateral side of the roof of the vehicle so as to be gripped by a passenger, thereby assisting an elderly or disabled passenger in entering or existing the vehicle.

(b) Background Art

Generally, the interior of a vehicle is provided at the upper ends of two lateral sides thereof with a plurality of auxiliary handles configured to be gripped by a passenger. The auxiliary handle is positioned in the inside of the vehicle, that is, under a headliner, and is fixedly connected to the body panel of the vehicle.

When the auxiliary handle is mounted on a vehicle such as a van, the auxiliary handle may be used to assist a passenger to enter the vehicle. With the emergence of a vehicle having a structure from which a B pillar is omitted, the role of the auxiliary handle is being emphasized as means for assisting a passenger, such an elderly or disabled passenger, to enter a vehicle.

Specifically, although the elderly are considered to be the main consumers due to aging world population, the demand for development of vehicles for the elderly is not yet satisfied.

Therefore, research on vehicles, which are provided with convenience items suitable for the elderly or disabled persons, is being performed. Particularly, vehicles for disabled persons are provided with various devices, such as a lifter for a disabled person, a rotatable seat, a wheelchair transportation device and a foot-driven direction indicator.

Such devices are distinguished from devices for supplementing reduction of overall physical ability. In other words, overall research on reduction of character recognition ability and color discrimination, and convenience in action of entering or exiting a vehicle is still insufficient.

Accordingly, research into vehicles, which are provided with a cluster lighting device for always-on light or in which a handle configured to be gripped by a passenger when the passenger enters or exits the vehicle is attached to a seat back, has been actively conducted.

As a result of such research, in conventional vehicles, an auxiliary handle is mounted on a lateral side surface of a vehicular seat so as to be efficiently gripped by an elderly or disabled passenger when he or she enters or exits the vehicle.

However, because such an auxiliary handle for a vehicle is mounted to a lateral side surface of a seat, that is, at a low level, it is difficult for an elderly or disabled passenger to grip the auxiliary handle when he or she enters or exits a vehicle, and it is difficult to support the body weight of a passenger when he or she stands up while gripping the auxiliary handle.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art. An object of the present disclosure is to provide an auxiliary handle device configured to be used in entering or exiting a vehicle, which is constructed such that, when the signal indicating the opening of a door is transmitted to a controller, a guide frame is slidably moved and thus a pair of guide pins are moved along a movement guide, with the result that a handle unit is selectively rotated downwards toward the opened door from a lateral side of the roof of the vehicle, thereby conferring effects of allowing the handle unit to be gripped by a passenger and of thus assisting an elderly or disabled passenger in entering or existing the vehicle.

In one aspect, the present disclosure provides an auxiliary handle device configured to be used in entering or exiting a vehicle including a cover unit including first and second movement guides, which define a movement path, a guide frame unit, which is connected to the cover unit so as to be slidably moved along a rail of a mounting plate mounted on a roof of the vehicle, and a handle unit, which is mounted on the cover unit so as to be selectively projected downwards from the mounting plate, the handle unit including a first guide pin and a second guide pin, which are respectively mounted in the first movement guide and the second movement guide such that the first and second guide pins are moved while being rotated so as to project the handle unit downwards from the mounting plate.

In a preferred embodiment, the cover unit may include a pair of cover units, which are disposed at two anteroposterior sides of the mounting plate.

In another preferred embodiment, the first and second guide pins may be respectively moved along the first movement guide and the second movement guide while maintaining an equal distance therebetween when the guide frame unit is slidably moved.

In still another preferred embodiment, the second movement guide may extend downwards from the cover unit, and the first movement guide may include a first path, disposed parallel to the second movement guide, and a second path, which is bent upwards at an end of the first path so as to be spaced apart from the second movement guide.

In yet another preferred embodiment, the second path may be bent upwards at the first path so as to be spaced apart from the second movement guide by a distance corresponding to a distance between the first guide pin and the second guide pin.

In still yet another preferred embodiment, the handle unit may be rotatably coupled to the guide frame unit so as to be sequentially moved among a rest position, a first position and a second position when the guide frame unit is slidably moved.

In a further preferred embodiment, the rest position may be a position in which the first guide pin and the second guide pin are respectively positioned at first ends of the first movement guide and the second movement guide such that the handle unit is retracted into the mounting plate.

In another further preferred embodiment, the first position may be a position in which the first guide pin is positioned at a boundary between the first path and the second path and the second guide pin is positioned at a second end of the second movement guide such that the handle unit is projected downwards toward an outside of the vehicle from the mounting plate.

In still another further preferred embodiment, the second position may be a position in which the first guide pin and the second guide pin are respectively positioned at second ends of the first movement guide and the second movement guide such that the handle unit is projected downwards toward an inside of the vehicle from the mounting plate.

In yet another further preferred embodiment, the auxiliary handle device may further include a plurality of sensors, which are provided at a sliding movement path of the guide frame unit so as to detect a position of the handle unit based on positions of the first guide pin and the second guide pin when coming into contact with the guide frame unit.

In still yet another further preferred embodiment, the plurality of sensors may be three sensors configured to detect positions of the handle unit corresponding to the rest position, the first position and the second position.

In a still further preferred embodiment, the handle unit may include a pair of connecting members, each of which includes the first guide pin and the second guide pin, and a grip member, which connects the pair of connecting members to each other and which projects downwards from the mounting plate so as to allow the handle unit to be selectively gripped by a user.

In still another further preferred embodiment, the grip member may include an LED light source, which is mounted in a mounting region in the grip member so as to emit light, and a transmissive lens configured to allow light emitted from the LED light source to be transmitted to an outside therethrough to thus be exposed to the outside.

In yet another further preferred embodiment, the LED light source may be replaced with lighting lamps or ultraviolet germicidal lamps, which have different colors.

Other aspects and preferred embodiments of the disclosure are discussed infra.

It is to be understood that the term "vehicle" or "vehicular" or other similar terms used herein are inclusive of motor vehicles in general, such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative-fuel vehicles (e.g. fuels derived from resources other than petroleum). As referred to herein, a hybrid vehicle is a vehicle that has two or more sources of power, for example a vehicle powered by both gasoline and electricity.

BRIEF DESCRIPTION OF THE FIGURES

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

Figure 1:
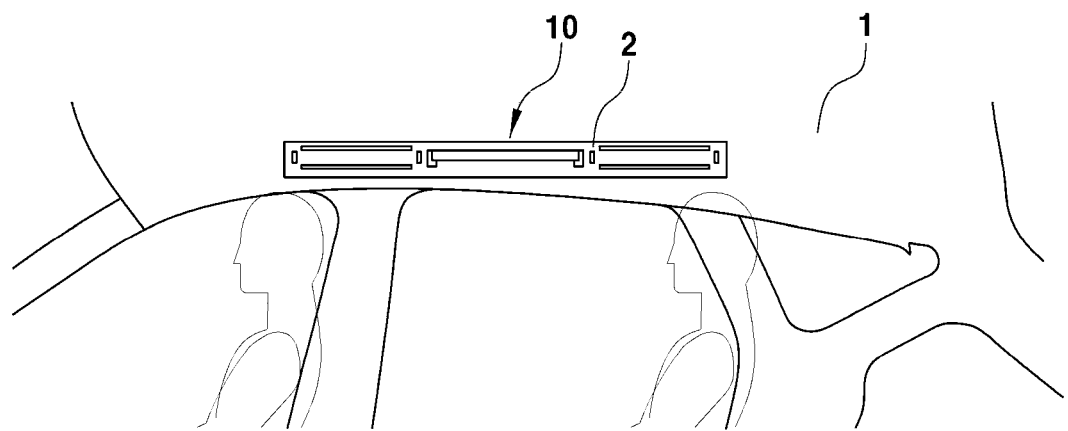
FIG. 1 is a view illustrating the position at which an auxiliary handle device configured to be used in entering and exiting a vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, the reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it is to be understood that the present description is not intended to limit the disclosure to the exemplary embodiments. On the contrary, the disclosure is intended to cover not only the exemplary embodiments, but also various alternatives, modifications, equivalents and other embodiments that may be included within the spirit and scope of the disclosure as defined by the appended claims.

Hereinafter, preferred embodiments of the present disclosure will be described in detail with reference to the accompanying drawings.

The objects described above, as well as other objects, features and advantages, will be clearly understood from the following preferred embodiments with reference to the attached drawings.

However, the present disclosure is not limited to the embodiments, and will be embodied in different forms. The embodiments are suggested only to offer a thorough and complete understanding of the disclosed contents and to sufficiently inform those skilled in the art of the technical concept of the present disclosure. The present disclosure is defined only by the categories of the claims.

Furthermore, in the following description of embodiments disclosed herein, if it is determined that a detailed description of known functions or configurations related to the disclosure would make the subject matter of the disclosure unclear, such detailed description is omitted.

Figure 2:
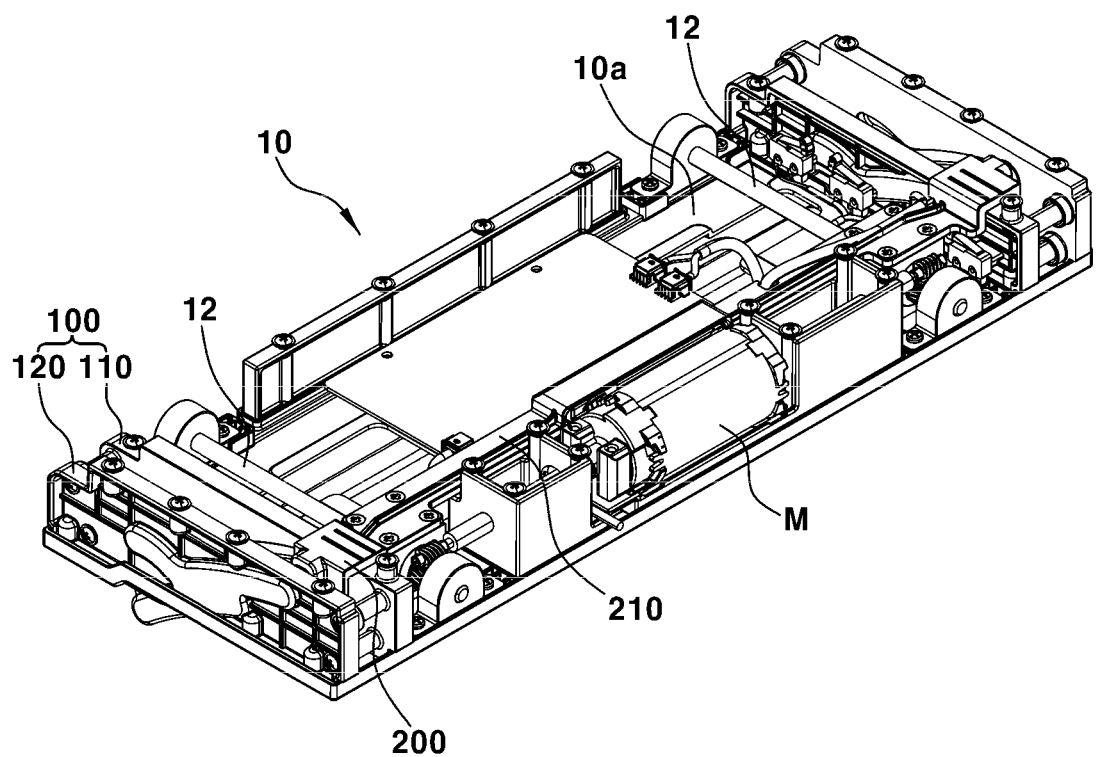
FIG. 2 is a view illustrating the structure of the auxiliary handle device configured to be used in entering and exiting a vehicle according to the embodiment of the present disclosure.

FIG. 1 is a view illustrating the position at which an auxiliary handle device configured to be used in entering and exiting a vehicle according to an embodiment of the present disclosure. FIG. 2 is a view illustrating the structure of the auxiliary handle device configured to be used in entering and exiting a vehicle according to the embodiment of the present disclosure.

Figure 3:
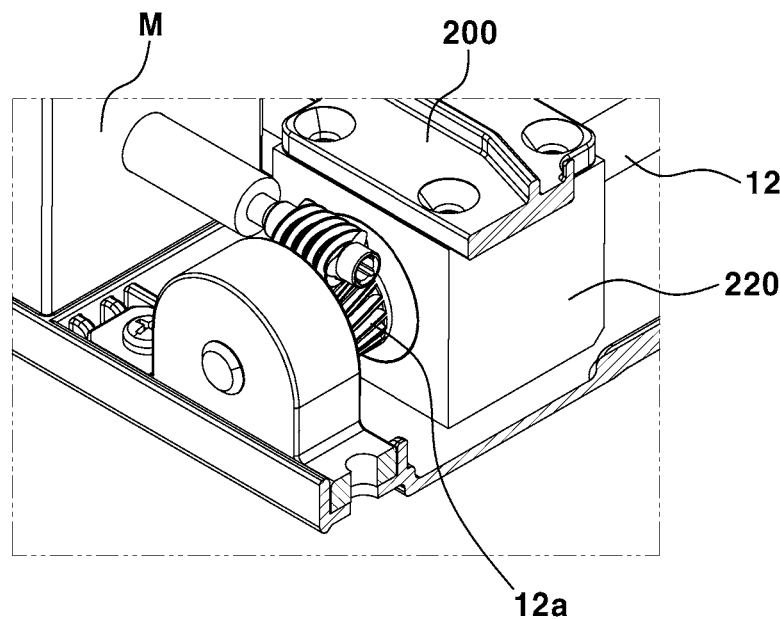
FIG. 3 is a view illustrating the operation of a guide frame of the auxiliary handle device configured to be used in entering and exiting a vehicle according to the embodiment of the present disclosure.
Figure 4:
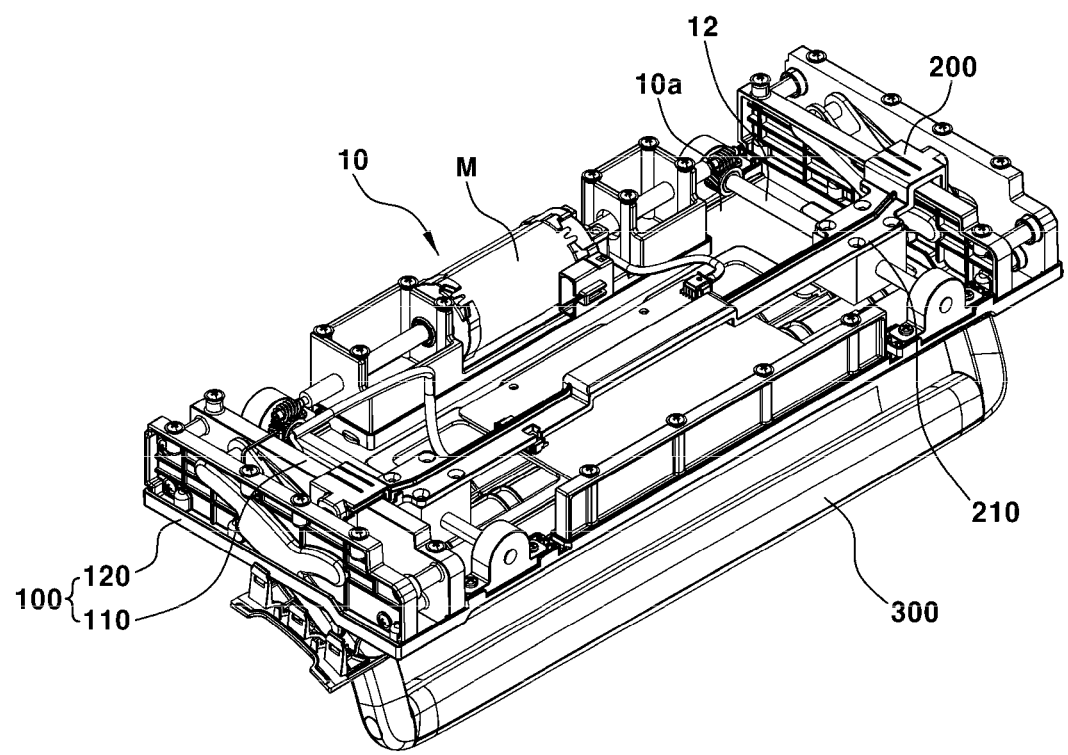
FIG. 4 is a view illustrating the operation of the handle unit of the auxiliary handle device configured to be used in entering and exiting a vehicle according to the embodiment of the present disclosure.
Figure 5:
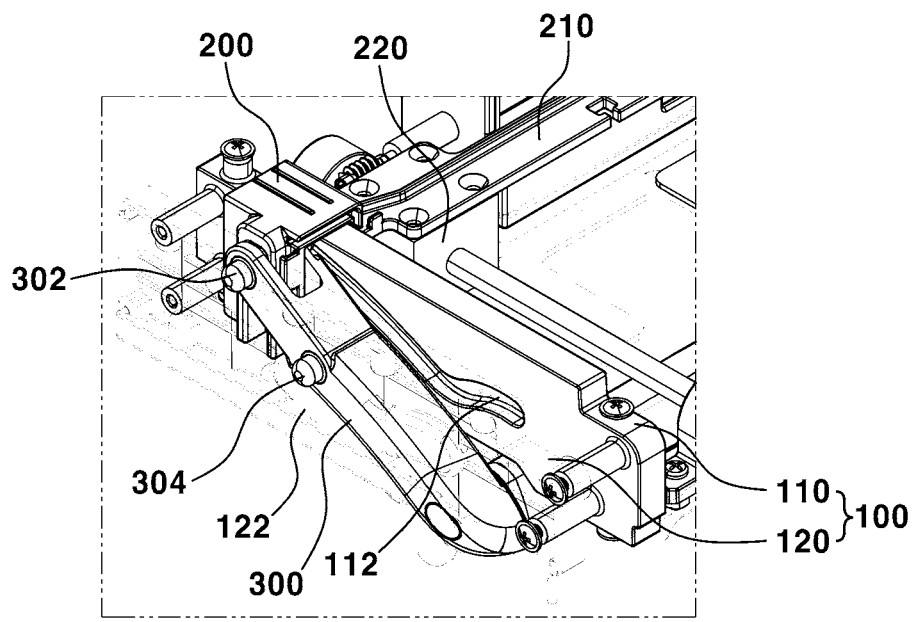
FIG. 5 is a view illustrating a first guide pin and a second guide pin of the auxiliary handle device configured to be used in entering and exiting a vehicle according to the embodiment of the present disclosure.

FIG. 3 is a view illustrating the operation of a guide frame of the auxiliary handle device configured to be used in entering and exiting a vehicle according to the embodiment of the present disclosure. FIG. 4 is a view illustrating the operation of the handle unit of the auxiliary handle device configured to be used in entering and exiting a vehicle according to the embodiment of the present disclosure. FIG. 5 is a view illustrating a first guide pin and a second guide pin of the auxiliary handle device configured to be used in entering and exiting a vehicle according to the embodiment of the present disclosure.

As illustrated in FIG. 1, the auxiliary handle device 10 configured to be used in entering and exiting a vehicle according to the embodiment of the present disclosure may be disposed at each of two lateral sides of the roof 1, particularly between two roof vent grilles 2 mounted on the roof 1 of a second-row passenger space.

The auxiliary handle device 10 is configured to selectively project toward the second-row passenger space so as to assist a passenger in entering and exiting the vehicle.

To this end, the auxiliary handle device 10 includes a cover unit 100, a guide frame unit 200 and a handle unit 300, as illustrated in FIGS. 2 and 4.

The cover unit 100 includes a pair of cover units 110, 120, which are disposed at two sides of a mounting plate 10a coupled to two roof vent grilles 2 of the second-row space of the vehicle so as to face each other.

Specifically, each of the cover units 100 may be composed of a first cover unit 110, disposed at the inside thereof, and a second cover unit 120, disposed at the outside thereof, which are coupled to each other.

Figure 6A:
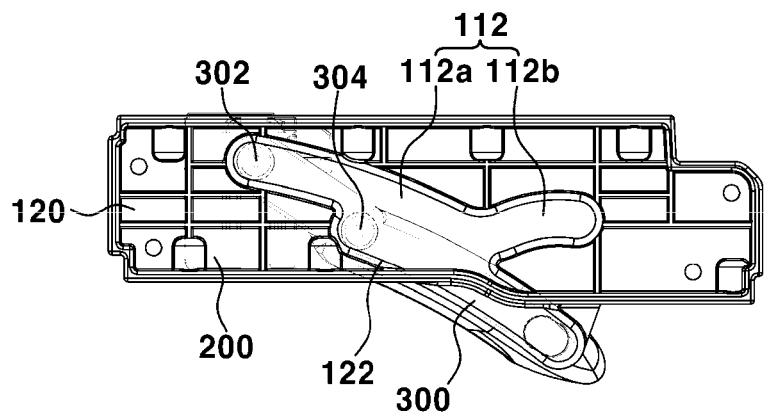
FIGS. 6A and 6B are views illustrating a rest position of the auxiliary handle device configured to be used in entering and exiting a vehicle according to the embodiment of the present disclosure.
Figure 6B:
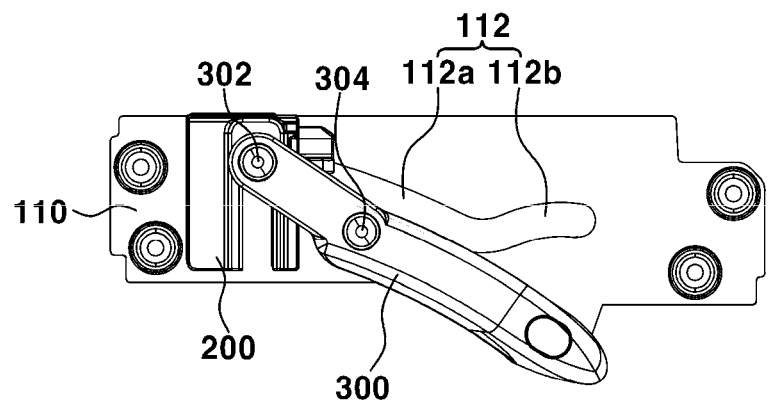

The first cover unit 110 includes a first movement guide 112, which extends by a predetermined length so as to define a movement path (see FIG. 6B).

The second cover unit 120 includes a second movement guide 122, which has the same size as that of the first cover unit 110 and is coupled to the outer side of the first cover unit 110 and which includes a movement guide, which faces the first movement guide 112, and is disposed adjacent to the movement path, as illustrated in FIG. 5.

Here, the second movement guide 122 may be configured to have a predetermined slope and to extend in a downward direction of the second cover unit 120.

The guide frame unit 200 includes a pair of guide frame units, which are disposed between the pair of cover units 100 so as to face each other and to surround the upper surfaces of the first cover units 110 and which are connected to each other via a connecting bar 210 and are slidably moved along rails 12 provided at the mounting plate 10a.

Specifically, when a motor M rotates, the rotative force of the motor M is transmitted to a helical gear 12a via a worm gear thereof. With the rotation of the helical gear 12a, a lead screw 220, which is threadedly engaged with the rail 12, is slidably moved longitudinally such that the guide frame units 200 are slid while being coupled to the first cover units 110.

Accordingly, when the guide frame unit 200 is slid in the above-described manner, the handle unit 300, which is coupled to the cover unit 100, selectively projects downwards from the mounting plate 10a, as illustrated in FIG. 4.

The handle unit 300 is rotatably coupled to the guide frame unit 200, which is disposed between the first cover unit 110 and the second cover unit 120 so as to surround the first cover unit 110.

As illustrated in FIG. 5, the handle unit 300 includes a first guide pin 302, which is disposed in the first movement guide 112, and a second guide pin 304, which is spaced apart from the first guide pin 302 and is disposed in the second movement guide 122.

When the guide frame unit 200 is slidably moved, the first guide pin 302 and the second guide pin 304 are moved along the first movement guide 112 and the second movement guide 122 in the state of maintaining a constant distance therebetween, with the result that the handle unit 300 is projected downwards from the mounting plate 10a, as illustrated in FIG. 4.

Since the handle unit 300 is projected downwards from the mounting plate 10a in the above-described manner, the handle unit 300 can be easily gripped by a passenger in the state in which the door is open. Consequently, when an elderly or disabled passenger enters the second-row passenger space in the vehicle, it is possible to efficiently assist the passenger in getting on the vehicle.

Figure 7A:
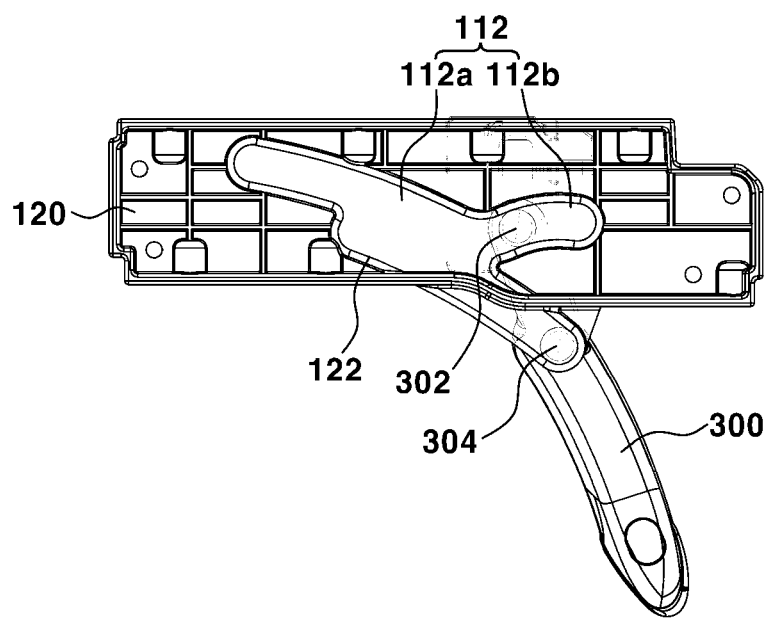
FIGS. 7A and 7B are views illustrating a first position of the auxiliary handle device configured to be used in entering and exiting a vehicle according to the embodiment of the present disclosure.
Figure 7B:
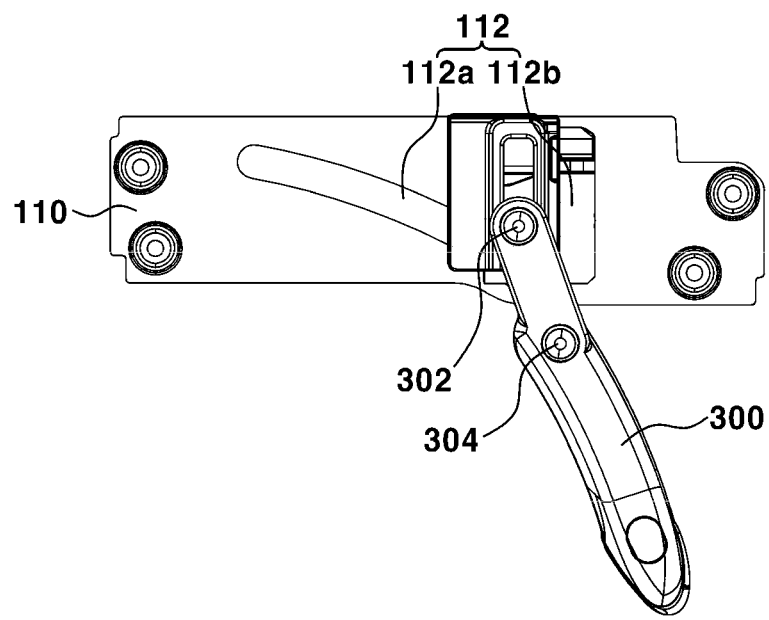
Figure 8A:
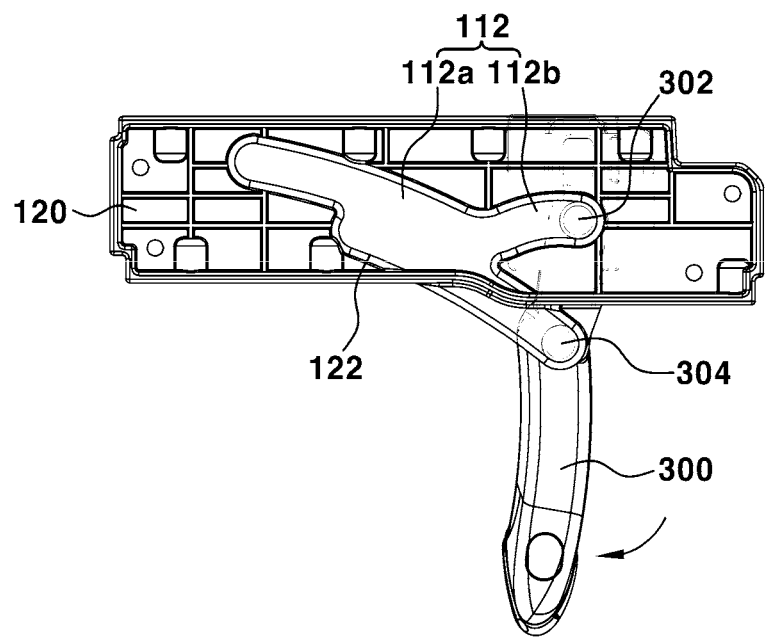
FIGS. 8A and 8B are views illustrating a second position of the auxiliary handle device configured to be used in entering and exiting a vehicle according to the embodiment of the present disclosure.
Figure 8B:
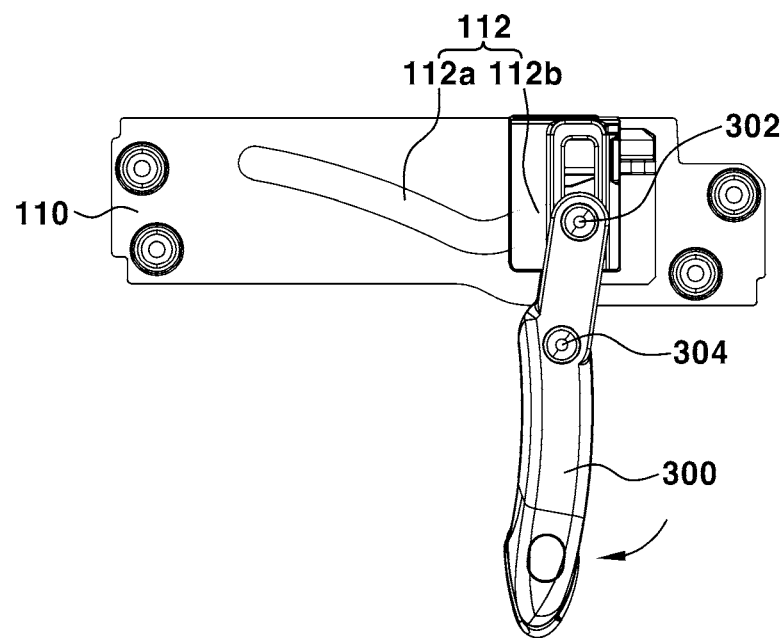

FIGS. 6A and 6B are views illustrating the mounted state of the auxiliary handle device configured to be used in entering or exiting a vehicle according to the embodiment of the present disclosure. FIGS. 7A and 7B are views illustrating the first position of the auxiliary handle device configured to be used in entering or exiting a vehicle according to the embodiment of the present disclosure. FIGS. 8A and 8B are views illustrating the second position of the auxiliary handle device configured to be used in entering or exiting a vehicle according to the embodiment of the present disclosure.

The auxiliary handle device configured to be used in entering or exiting a vehicle according to the embodiment of the present disclosure is constructed such that, when the guide frame unit 200 is slidably moved, the handle unit 300 is sequentially moved to the first position and the second position from the rest position while being rotated.

Rest Position

The second movement guide 122 is configured to project and extend downwards from the second cover unit 120, and the first movement guide 112 includes a first path 112a, which is disposed parallel to the second movement guide 122 of the second cover unit 120, and a second path 112b, which is bent upwards at the end of the first path 112a so as to be spaced apart from the second movement guide 122 in a vertical direction.

Specifically, the second path 112b may be bent upwards at a predetermined angle relative to the first path 112a such that the end thereof is spaced apart from the end of the second movement guide 122 by a length corresponding to the distance between the first guide pin 302 and the second guide pin 304.

As illustrated in FIGS. 6A and 6B, the rest position may be set to be a position in which the first guide pin 302 and the second guide pin 304 are respectively positioned at the first and second ends of the first movement guide 112 and the second movement guide 122 and the handle unit 300 is retracted into the mounting plate 10a.

The rest position may be set to be the initial position for the first guide pin 302 and the second guide pin 304. Because the handle unit 300 is exposed to the outside on the minimum surface area thereof in the rest position, the rest position may be the position when the door is in the closed state.

First Position

As illustrated in FIGS. 7A and 7B, the first position may be set to be a position in which the first guide pin 302 is positioned at the boundary between the first path 112a and the second path 112b, that is, at the bent region of the first movement guide 112 and the second guide pin 304 is positioned at the second end of the second movement guide 122.

As described above, because the first guide pin 302 is moved while maintaining a constant distance relative to the second guide pin 304, when the guide frame unit 200 is slidably moved together with the handle unit 300, the second guide pin 304, which is positioned before the first guide pin 302, is caught by the second end of the second movement guide 122 and is held thereat.

When the second guide pin 304 is caught by the second end of the second movement guide 122 and is held thereat, the first guide pin 302 is positioned at the boundary between the first path 112a and the second path 112b.

Accordingly, when the first guide pin 302 and the second guide pin 304 are respectively moved along the first movement guide 112 and the second movement guide 122 and thus reach the first position, the handle unit 300 is projected downwards toward the outside of the vehicle from the mounting plate 10a.

In other words, the first position may be defined as a position in which the first guide pin 302 and the second guide pin 304 of the handle unit 300 are slidably moved along the first movement guide 112 and the second movement guide 122 by the sliding movement of the guide frame unit 200 such that the handle unit 300 is projected toward the outside of the vehicle so as to serve as an auxiliary handle for a passenger.

Because the handle unit 300 is projected toward the outside from the inside of the vehicle so as to maximally prevent interference in the inside of the vehicle, the handle unit 300 is capable of serving as the auxiliary handle for a passenger and it is possible to prevent the head of the passenger from colliding with the handle unit 300.

Second Position

When the guide frame 200 is further slidably moved from the first position in which the second guide pin 304 is positioned at the second end of the second movement guide 122, the first guide pin 302 is moved to the second end of the first movement guide 112 such that the handle unit 300 is rotated toward the inside of the vehicle so as to project downwards from the mounting plate 10a.

As illustrated in FIGS. 8A and 8B, the second position may be set to be a position in which the first guide pin 302 and the second guide pin 304 are respectively caught by the second ends of the first movement guide 112 and the second movement guide 122 and are held thereat.

As a result, because the handle unit 300 is almost vertically projected downwards toward the inside of the vehicle from the mounting plate 10a and the first guide pin 302 and the second guide pin 304 are respectively caught by the second ends of the first movement guide 12 and the second movement guide 122 and are held thereat, it is possible to stably support the load of the passenger.

Consequently, since the handle unit 300 is selectively moved to the first position from the rest position or to the second position from the first position so as to be projected downwards from the mounting plate 10a when the door is opened, it is possible to allow the passenger to easily enter the second-row space of the vehicle while gripping the handle unit 300.

Figure 9:
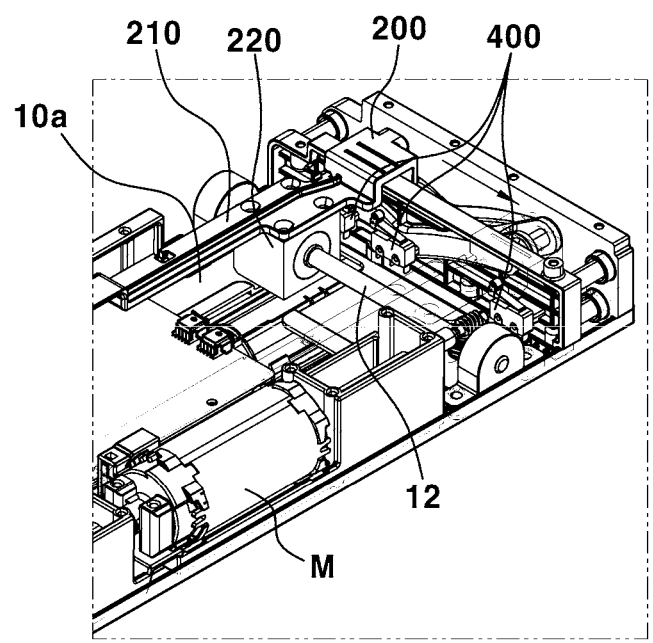
FIG. 9 is a view illustrating a sensor of the auxiliary handle device configured to be used in entering and exiting a vehicle according to the embodiment of the present disclosure.

FIG. 9 is a view illustrating a sensor unit of the auxiliary handle device configured to be used in entering or exiting a vehicle according to the embodiment of the present disclosure.

As illustrated in FIG. 9, the auxiliary handle device 10 configured to be used in entering or exiting a vehicle according to the embodiment of the present disclosure may further include the sensor unit 400.

The sensor unit 400 includes a plurality of sensors, which are mounted on the sliding movement path of the guide frame unit 200 and which are capable of detecting the position of the handle unit 300 as well as the positions of the first guide pin 302 and the second guide pin 304 by selective contact with the guide frame unit 200, which is slidably moved.

Specifically, the sensor unit 400 may include three sensors configured to detect the position of the handle unit 300 corresponding to one of the rest position, the first position and the second position.

The sensor unit 400 is connected to an additional controller (not shown) so as to transmit the detected value thereto. Consequently, the controller is capable of efficiently determine where the handle unit 300 is positioned among the rest position, the first position and the second position.

Figure 10:
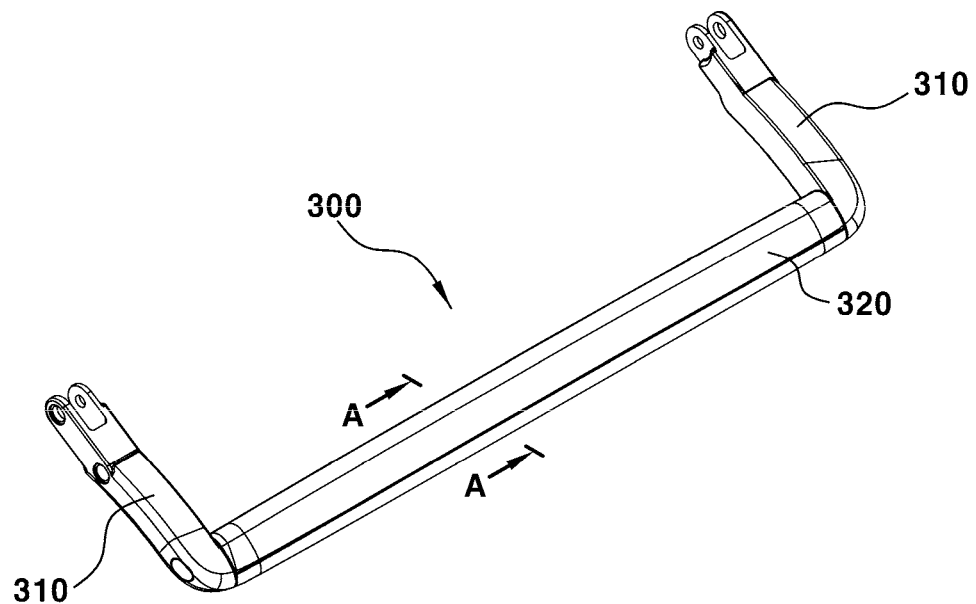
FIG. 10 is a view illustrating a grip member of a handle unit of the auxiliary handle device configured to be used in entering and exiting a vehicle according to the embodiment of the present disclosure.
Figure 11:
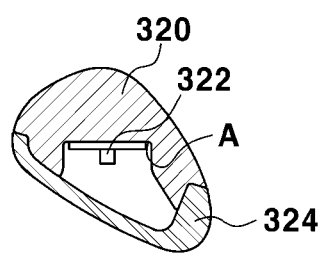
FIG. 11 is a cross-sectional view of the auxiliary handle device configured to be used in entering and exiting a vehicle according to the embodiment of the present disclosure, taken along line A-A in FIG. 10.

FIG. 10 is a view illustrating a grip member of the handle unit of the auxiliary handle device configured to be used in entering or exiting a vehicle according to the embodiment of the present disclosure. FIG. 11 is a cross-sectional view illustrating the auxiliary handle device configured to be used in entering or exiting a vehicle according to the embodiment of the present disclosure, taken along line A-A in FIG. 10.

As illustrated in FIG. 10, the auxiliary handle device 10 configured to be used in entering or exiting a vehicle according to the embodiment of the present disclosure includes the handle unit 300. The handle unit 300 includes a connecting member 310 and a grip member 320.

The connecting member 310 includes a pair of connecting members, which respectively include the first guide pin 302 and the second guide pin 304 and which is mounted on the cover unit 100 coupled to the two anteroposterior ends of the mounting plate 10a.

Specifically, the connecting members 310 are mounted between the first cover unit 110 and the second cover unit 120 at the two anteroposterior ends of the mounting plate 10a.

The grip member 320 connects the pair of connecting members 310 to each other. When the handle unit 300 is positioned at the first position or the second position, the grip member 320 is projected downwards from the mounting plate 10a so as to be gripped by a passenger who is entering the vehicle or is sitting on the seat.

As illustrated in FIG. 11, the grip member 320 may include an LED light source 322 and a transmissive lens 324.

The LED light source 322 is mounted in a mounting region A in the grip member 320 and is connected to the PCB of the mounting plate 10a in order to server as a lamp. When power is applied to the LED light source 322, the LED light source 322 emits selective lights.

Alternatively, the LED light source 322 may be replaced with lighting lamps or ultraviolet germicidal lamps, which have different colors.

In other words, the LED light source 322 may be replaced with a white colored lighting lamp and a yellow colored lighting lamp such that the light source is used as a welcome lamp when the door is opened and is used as a mood lamp when the door is closed.

In addition, the LED light source 322 may be replaced with ultraviolet germicidal lamps in order to sterilize the grip member 320 or to sterilize clothes when the grip member 320 is used as a hanger.

The transmissive lens 324 is mounted on the front surface of the grip member 320 so as to transmit the light emitted from the LED light source 322 therethrough.

Figure 12:
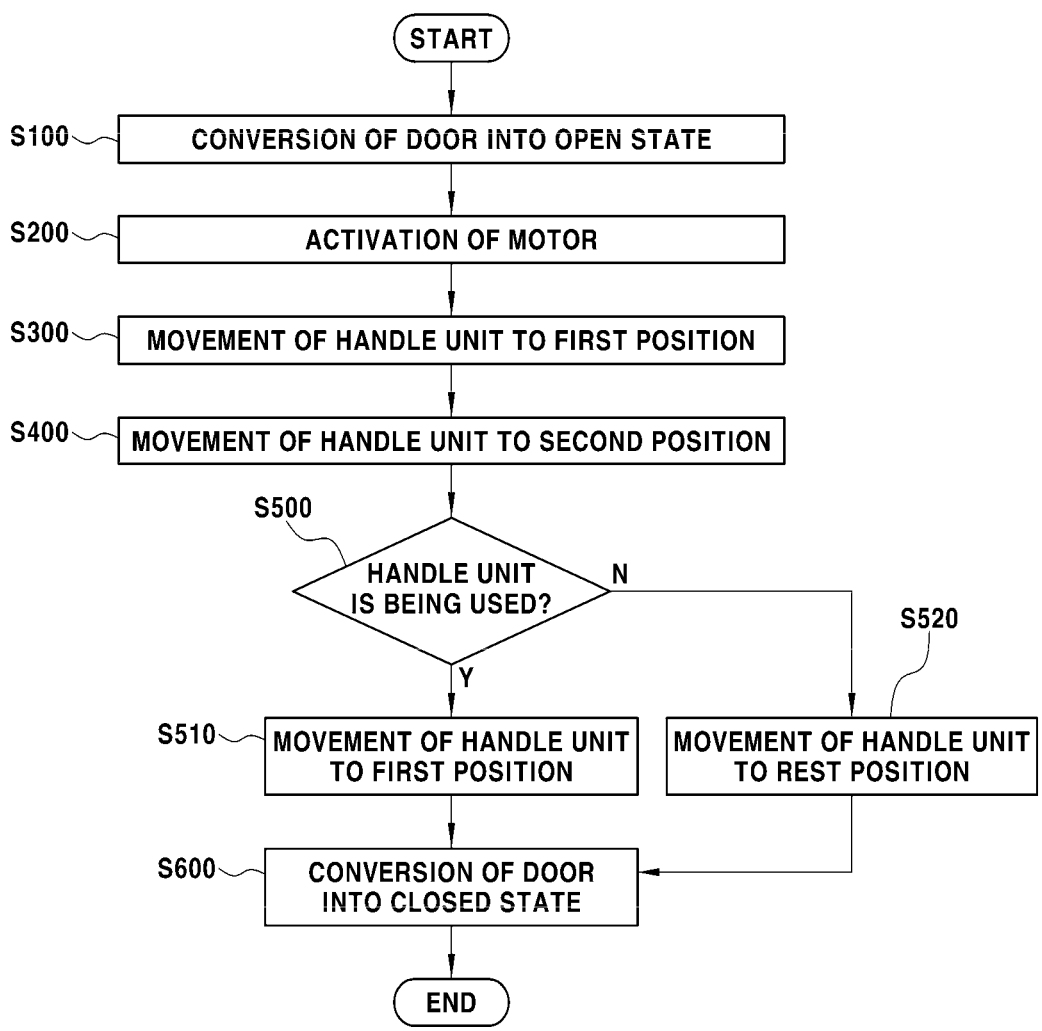
FIG. 12 is a flowchart illustrating the operational sequence of the auxiliary handle device configured to be used in entering and exiting a vehicle according to the embodiment of the present disclosure.

FIG. 12 is a view illustrating the operational sequence of the auxiliary handle device configured to be used when entering or exiting a vehicle according to the embodiment of the present disclosure.

The operation of the auxiliary handle device configured to be used when entering or exiting a vehicle according to the embodiment of the present disclosure when a passenger enters the vehicle will be sequentially described with reference to FIG. 12.

When the door is converted into the open state at S100, the controller (not shown) performs control to turn on the LED light source 322 so as to be used as a welcome lamp and, at the same time, to activate the motor M to thus rotate the helical gear 12a at S200.

By the rotation of the helical gear 12a, the guide frame unit 200 is slidably moved at S300. Consequently, the first guide pin 302 and the second guide pin 304 are moved along the first movement guide 112 and the second movement guide 122 so as to sequentially move the handle unit 300 to the first position and then the second position from the rest position at S300 and S400.

As a result, because the handle unit 300 is moved to the second position, a passenger can easily enter the second-row space of the vehicle while gripping the handle unit 300.

At this time, when it is determined (not shown) that the passenger sits on the second-row seat using an additional weight sensor, it is determined whether or not the handle unit 300 is being used by the passenger at S500.

When it is determined that the handle unit is being used, the handle unit 300 is moved to the first position from the second position so as to enable the passenger to grip the handle unit 300 at S510, and then the door is converted into the closed state at S600.

When the door is again converted into the open state from this state, the passenger exists the vehicle while gripping the handle unit 300 because the handle unit 300 is maintained at the first position. Thereafter, when the door is closed, the handle unit 300 is moved to the rest position from the first position.

Meanwhile, when it is determined that the handle unit is not used in operation at S500, the handle unit 300 is moved from the second position to the first position and then to the rest position so as to be retracted into the mounting plate 10a at S520, whereby the handle unit 300 is not exposed to the outside. Subsequently, the door is converted into the closed state at S600.

When the door is again converted into the open state from this state, the handle unit 300 is again moved to the first position so as to enable the passenger to grip the handle unit 300 because the handle unit 300 is maintained at the rest position, whereby the passenger can exist the vehicle while gripping the handle unit 300. Thereafter, when the door is again closed, the handle unit 300 is moved to the rest position from the first position.

As is apparent from the above description, when the signal indicating the opening of the door is transmitted to the controller, the guide frame is slidably moved and thus the pair of guide pins are moved along the movement guide, with the result that the handle unit is selectively rotated downwards toward the opened door from a lateral side of the roof of the vehicle, thereby conferring effects of allowing the handle unit to be gripped by a passenger and of thus assisting an elderly or disabled passenger in entering or existing the vehicle.

Furthermore, since the handle unit is selectively moved to one of the rest position, the first position and the second position by the sliding movement of the guide frame, there are effects of assisting a passenger in entering or existing the vehicle and of enabling the passenger to sit on the second-row seat while gripping the handle unit.

In addition, since the light source is incorporated into the grip member constituting the handle unit and the light emitted from the light source is transmitted to the outside through the lens of the grip member, there is an effect of enabling the handle unit to selectively serve as a welcome lighting, a mood lighting or an ultraviolet sterilization device by manipulation of a user.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. An auxiliary handle device configured to be used in entering or exiting a vehicle comprising:
   a cover unit including first and second movement guides, which define a movement path;
   a guide frame unit connected to the cover unit, and configured to be slidably moved along a rail of a mounting plate mounted on a roof of the vehicle; and
   a handle unit mounted on the cover unit, and configured to be selectively projected downwards from the mounting plate, the handle unit including a first guide pin and a second guide pin, the first guide pin being mounted in the first movement guide and the second guide pin being mounted in the second movement guide such that the first and second guide pins are moved while being rotated to project the handle unit downwards from the mounting plate.

2. The auxiliary handle device of claim 1, wherein the cover unit includes a pair of cover units, which are disposed at two anteroposterior sides of the mounting plate.

3. The auxiliary handle device of claim 1, wherein the first guide pin is configured to be moved along with first movement guide and the second guide pin is configured to be moved along the second movement guide while maintaining an equal distance therebetween when the guide frame unit is slidably moved.

4. The auxiliary handle device of claim 1, wherein the second movement guide extends downwards from the cover unit, and the first movement guide includes a first path, disposed parallel to the second movement guide, and a second path, which is bent upwards at an end of the first path so as to be spaced apart from the second movement guide.

5. The auxiliary handle device of claim 4, wherein the second path is bent upwards at the first path to be spaced apart from the second movement guide by a distance corresponding to a distance between the first guide pin and the second guide pin.

6. The auxiliary handle device of claim 4, wherein the handle unit is rotatably coupled to the guide frame unit to be sequentially moved among a rest position, a first position, and a second position when the guide frame unit is slidably moved.

7. The auxiliary handle device of claim 6, wherein the rest position is a position in which the first guide pin is positioned at a first end of the first movement guide and the second guide pin is positioned at a first end of the second movement guide, such that the handle unit is retracted into the mounting plate.

8. The auxiliary handle device of claim 6, wherein the first position is a position in which the first guide pin is positioned at a boundary between the first path and the second path, and the second guide pin is positioned at a second end of the second movement guide such that the handle unit is projected downwards toward an outside of the vehicle from the mounting plate.

9. The auxiliary handle device of claim 6, wherein the second position is a position in which the first guide pin is positioned at a second end of the first movement guide and the second guide pin is positioned at a second end of the second movement guide, such that the handle unit is projected downwards toward an inside of the vehicle from the mounting plate.

10. The auxiliary handle device of claim 6, further comprising a plurality of sensors provided at a sliding movement path of the guide frame unit to detect a position of the handle unit based on positions of the first guide pin and the second guide pin when coming into contact with the guide frame unit.

11. The auxiliary handle device of claim 10, wherein the plurality of sensors comprise three sensors configured to detect positions of the handle unit corresponding to the rest position, the first position, and the second position.

12. The auxiliary handle device of claim 1, wherein the handle unit includes:
a pair of connecting members, each connecting member including the first guide pin and the second guide pin; and
a grip member connecting the pair of connecting members to each other and projecting downwards from the mounting plate to allow the handle unit to be selectively gripped by a user.

13. The auxiliary handle device of claim 12, wherein the grip member includes:
an LED light source mounted in a mounting region in the grip member to emit light; and
a transmissive lens configured to allow light emitted from the LED light source to be transmitted to an outside therethrough to be exposed to the outside.

14. The auxiliary handle device of claim 13, wherein the LED light source is configured to be replaced with lighting lamps or ultraviolet germicidal lamps, which have different colors.

* * * * *